United States Patent
Wilkinson (10) Patent No.: US 7,949,848 B2
(45) Date of Patent: May 24, 2011

(54) DATA PROCESSING APPARATUS, METHOD AND COMPUTER PROGRAM PRODUCT FOR REDUCING MEMORY USAGE OF AN OBJECT ORIENTED PROGRAM

(75) Inventor: Graham Peter Wilkinson, Cambridge (GB)

(73) Assignee: ARM Limited, Cambridge (GB)

( * ) Notice: Subject to any disclaimer, the term of this patent is extended or adjusted under 35 U.S.C. 154(b) by 1111 days.

(21) Appl. No.: 11/715,508

(22) Filed: Mar. 8, 2007

(65) Prior Publication Data
US 2008/0222198 A1    Sep. 11, 2008

(51) Int. Cl.
G06F 12/00    (2006.01)
G06F 17/30    (2006.01)
(52) U.S. Cl. .................................. 711/171; 707/999.103
(58) Field of Classification Search .......................... None
See application file for complete search history.

(56) References Cited

U.S. PATENT DOCUMENTS

| | | | |
|---|---|---|---|
| 2005/0193373 A1* | 9/2005 | Wannamaker et al. | 717/118 |
| 2006/0026564 A1* | 2/2006 | Cabillic | 717/118 |

* cited by examiner

Primary Examiner — Denise Tran
(74) Attorney, Agent, or Firm — Nixon & Vanderhye P.C.

(57) ABSTRACT

The present invention for reducing memory usage of an object oriented program. The object oriented program comprises class definitions used to create objects, each class definition providing at least one function that can be run in respect of objects created from that class definition, and identifying a number of storage items to be provided in memory for each object to store data values associated with that object. The method involves determining an original size associated with each storage item, and analysing the class definition to identify any numeric ranges associated with the storage items. For each storage item for which a numeric range is identified, it is determined if the original size can be reduced whilst still supporting the numeric range, and if so a modified size less than the original size is allocated to that storage item. Thereafter, the class definition is altered having regard to any storage element that has been allocated a modified size.

13 Claims, 10 Drawing Sheets

CLASS LOADING

TEMPORARY TABLE FOR STACK VARIABLES /500

| ORIGINAL STACK INDEX | STACK VARIABLE | TYPE | VALID | MIN VALUE | MAX VALUE | NEW STACK INDEX | |
|---|---|---|---|---|---|---|---|
| 0 | a | INT | ✓ | 0 | 10 | 0 | CHANGE SIZE |
| 4 | b | INT | ✗ | | | 1 | DON'T CHANGE SIZE |
| 8 | c | BYTE | ✓ | 4 | 200 | 5 | DON'T CHANGE SIZE |
| 9 | | | | | | 6 | |
| | | | | | | | |
| | | | | | | | |

510 — row 1; 520 — row 2; 530 — row 3

FIG 6A

PERSISTENT TABLE FOR FIELDS /550

| ORIGINAL OFFSET | FIELD | TYPE | VALID | MIN VALUE | MAX VALUE | NEW OFFSET | METHOD(S) ACCESSING FIELD |
|---|---|---|---|---|---|---|---|
| | | | | | | | |

DATA PROCESSING APPARATUS, METHOD AND COMPUTER PROGRAM PRODUCT FOR REDUCING MEMORY USAGE OF AN OBJECT ORIENTED PROGRAM

BACKGROUND OF THE INVENTION

1. Field of the Invention

The present invention relates to a data processing apparatus, method and computer program product for reducing memory usage of an object oriented program.

2. Description of the Prior Art

In object oriented programming (OOP) systems, a "class" (also referred to herein as a class definition) can be used to provide a template for the creation of "objects" having characteristics of that class. Objects are typically created dynamically (in the Java programming language, using an operator called the "new" operator) during program execution. The class definition will typically provide a number of functions (also referred to herein as "methods") that can operate on objects created from that class definition. Further, each class definition will typically identify a number of storage items to be provided in memory for each object created from that class definition, these storage items being used to store data values associated with the object. One example of such storage items are the fields that are typically defined by a class definition. Each time an object is created from the class definition, those fields will be replicated within the memory associated with that object, and particular values given to those fields. Considering a simple example, a class definition may be established for a bicycle, and a number of fields may be defined for that class, for example cadence, speed, number of gears, etc. When each object is created from that class definition, values of cadence, speed, gear, etc will be instantiated as fields within the object.

As another example of storage items that can be identified by the class definition, each of the methods defined by the class definition will typically require one or more temporary variables when executing, and these temporary variables are also storage items that need to be provided in memory for each executing method.

Modern day object oriented programs may create many objects during program execution, that each use a certain amount of space in memory. Typically the memory space allocated to the program is a scarce resource and needs to be used as efficiently as possible. The objects are sometimes quite dynamic and, as mentioned earlier, typically have a set of fields within them. Instances of these fields can be very numerous, either as separate data entities, or as array members. Further, as mentioned earlier, storage items also need to be provided in memory for any methods executing, so as to provide locations in which to store temporary variables used by those methods. Hence, it will be appreciated that the amount of memory that needs to be allocated to storage items such as the fields associated with each object, or the temporary variables associated with each executing method, becomes significant.

Generally, the instructions constituting the object oriented program will not run directly on the underlying hardware, and instead a virtual machine (VM) is provided between the object oriented program and the underlying hardware to convert the OOP instructions into instructions that can be executed on the underlying hardware. Typically the virtual machine is responsible for generating objects from the associated class definitions and allocating space in memory for each such object, including space for the fields of the object. The virtual machine also typically provides space in memory for each executing method, including space for holding temporary variables for use when executing. One example of such a virtual machine is the Java virtual machine (JVM) used to execute Java programs.

In modern day systems, it is becoming more commonplace for the virtual machine to be able to support multiple programs, and this further increases the importance of managing the space that each object uses in memory.

Accordingly, it would be desirable to provide a technique for reducing memory usage of an object oriented program.

In the area of Web page design, a programming language called PHP has been developed for producing dynamic Web pages. PHP does not mandate any typing rules from the programmer and will use the appropriate data type conversions in the context of the specified operations. As a result, the type associated with a variable can be changed at runtime, and accordingly in some instances the data constituting that variable may be considered to be a string, whilst in other situations it may be considered to be an integer. However, the size of the variables is not varied. With regard to the issue of reducing memory usage, PHP preserves memory by using dynamic and sparse arrays to enable the amount of data to increase as needed, but the data type sizes are fixed.

In the area of compiler technology, some C compilers choose the enumerated type variable width based upon the largest enum value used. Hence, the compiler can decide whether to allocate an enum as an integer, a byte, a character, etc. However, this is not performed at runtime, but instead is conformed at compilation time. Hence, such a technique does not allow a variable's size to be dynamically changed once the machine is running.

Whilst the above-described techniques allow some manipulation of data type to take place, they do not provide any mechanisms for reducing memory usage of an object oriented program, and in particular for reducing the amount of memory allocated to storage items to be provided in memory for each object to store data values associated with the object.

SUMMARY OF THE INVENTION

Viewed from a first aspect, the present invention provides a method of reducing memory usage of an object oriented program within a data processing apparatus, the object oriented program comprising at least one class definition used to create objects, each class definition providing at least one function that can be run in respect of objects created from that class definition, and identifying a number of storage items to be provided in memory for each object to store data values associated with the object, for each class definition the method being performed prior to any objects being created from that class definition, and being performed in respect of at least a subset of the storage items identified by that class definition, the method comprising the steps of: (a) determining an original size associated with each storage item; (b) analysing at least the class definition to identify any numeric ranges associated with the storage items; (c) for each storage item for which a numeric range is identified, determining if the original size can be reduced whilst still supporting the numeric range, and if so allocating to that storage item a modified size less than the original size; and (d) altering the class definition having regard to any storage element that has been allocated a modified size.

The present invention provides a method for reducing memory usage of an object oriented program, for a class definition the method being performed prior to any object being created from that class definition and being performed in respect of at least a subset of the storage items identified by that class definition. Hence, the method could be performed in respect of all storage items identified by the class definition, hence including both the fields identified by the class definition and any temporary variables associated with functions, or alternatively may be applied to just a subset of those storage items, for example all fields identified by the class definition, certain categories of fields specified by the class definition, or temporary variables associated with functions, etc.

For each storage item in respect of which the memory reduction technique is to be performed, the method comprises analysing at least the class definition to identify any numeric range associated with that storage item, and if a numeric range is identified determining if an original size associated with that storage item can be reduced whilst still supporting the numeric range. If so, that storage item is allocated a modified size less than the original size, and the class definition is altered having regard to that modified size of the storage element. For certain types of storage item, for example temporary variables associated with functions, or private fields identified by the class definition (private fields are fields which can only be used and modified by functions of the associated class), the analysis step used to identify numeric ranges only needs to be performed in respect of the class definition defining those storage items, since their numeric ranges will not be influenced by properties of other class definitions. However, for other types of storage items, for example fields which are not private fields, it may be necessary to look at certain other class definitions (in addition to the class definition identifying that storage item) when looking for numeric ranges.

With regard to the alterations required to the class definition when a storage item is allocated a modified size, such alterations can take a variety of forms. For example, considering a storage item taking the form of a field identified by the class definition, the definition of that field within the class definition will need changing and this may affect the locations associated with other fields. Further, the instructions (also referred to herein as bytecodes) of any methods that access that field (and any other affected fields) may need changing to reflect the new size of the storage item. Similarly, for temporary variables, it will be necessary to modify bytecodes within the method using that temporary variable. This may require more than just altering the bytecodes that actually access that altered variable, since the locations to be associated with other temporary variables used by that function will often also need to change having regard to the change in size of the altered variable, and accordingly bytecodes referencing those variables will also need to be altered accordingly.

In accordance with the techniques of the present invention, the original sizes associated with storage items identified by a class definition are analysed prior to any objects being created from that class definition, and if it is determined that a reduced size can be used whilst still supporting the numeric range required, then a reduced size is allocated, thereby yielding significant reductions in memory usage. Accordingly, the data sizes associated with particular storage items can be reduced if the range does not require the original size associated with that storage item, and this process can be performed dynamically at runtime, prior to objects being created from a class definition to which the memory reduction method is applied.

As mentioned earlier, the storage items can take a variety of forms. However, in one embodiment, the storage items are fields identified by the class definition, and said step (b) comprises the step of: reviewing each function provided by the class definition to determine said numeric ranges. Particularly significant reductions in memory usage can be realised when applying the method to fields identified by the class definition, since those fields are replicated in each object generated from that class definition, and often significant numbers of objects are created from each class definition, with the memory saving hence being replicated for each object created. As an example, if for a field specified to be a 32-bit integer, the analysis process indicates that a byte (i.e. 8 bits) would be sufficient to accommodate the identified numeric range, then that field can be allocated as a byte and the class definition modified accordingly. Every time an object is created from that class definition, 24 bits of memory space are saved. If such savings are also achievable for a number of the other fields specified, and multiple objects are created, it will be appreciated that the potential savings in memory usage rapidly become significant.

In one particular embodiment, the memory reduction technique is not applied to all fields, but instead is only applied to any private fields identified by the class definition. The process is simplified if only private fields are considered, since the analysis process only needs to look at the class definition defining the field, since private fields can only be used and modified by that particular class definition.

In alternative embodiments, or in addition to the above steps taken in respect of fields identified by the class definition, temporary variables associated with functions can also be subjected to the memory reduction technique. In such embodiments, for each temporary variable, the associated function is reviewed at said step (b) to identify any numeric range associated with that temporary variable. Temporary variables are defined on a function-by-function basis, and accordingly by definition are private to a particular function. Accordingly, when seeking to identify numeric ranges for a particular temporary variable, it is only necessary to review the associated function. The temporary variables may take a variety of forms, but in one embodiment are either parameters passed to a function when that function executes, or local variables specified by the function and used by the function when executing.

The logic provided within the data processing apparatus to perform the memory reduction techniques of embodiments of the present invention can be implemented in a variety of ways. However, in one embodiment, the memory reduction method of embodiments of the present invention is performed by a virtual machine executing on a processing circuit of the data processing apparatus. In embodiments where virtual machines are used, the virtual machine will typically be provided with a region of addressable memory, and will be responsible for allocating areas in that memory for objects, including the fields specified within those objects, and for providing working memory for the functions when executing, this working memory including space for the temporary variables used by those functions. Accordingly, the memory reduction technique of embodiments of the present invention can be readily accommodated within the virtual machine, since the virtual machine is able to apply that method in respect of a particular class definition prior to any objects being created from that class definition.

In one particular embodiment, the method is performed during a class loading operation performed by the virtual machine, such that the altered class definition is loaded into memory. Hence in accordance with such embodiments, when it is determined during runtime that a particular class needs loading, then the memory reduction technique is applied and any alterations to the class definition made, prior to the class definition being loaded into memory.

In one embodiment of the present invention, if a numeric range cannot be identified for a particular storage item, then the memory reduction technique is not applied to that storage item. It may be that the numeric range cannot be identified because the range is indefinite, or because the range is considered too expensive to determine (as may be the case, for example, for certain fields which are not private fields, and hence would require a significant analysis to take place). However, in one embodiment, even for such storage items for which a numeric range is not identified, a modified size less than the original size can be allocated to that storage item speculatively.

In particular, in one embodiment, said step (c) further comprises the step of, for at least one storage item for which a numeric range is not identified, speculatively allocating to that storage item a modified size less than the original size, and the method further comprises the steps of: (e) providing a check mechanism to determine, whenever said at least one storage item is accessed, whether the modified size allocated to that storage item is sufficient; and (f) if the modified size is not sufficient, performing a recovery mechanism to expand the size allocated to that storage item to a new size. Hence, in such embodiments, a check mechanism is used to determine, when such a speculatively modified storage item is later accessed, whether the modified size is sufficient, and if not a recovery mechanism is performed to expand the size to a new size. The new size may be the originally specified size for that storage item or some size intermediate between the modified size and the original size. If as a result of the recovery mechanism the size allocated to the storage item is expanded to the originally specified size, then the check mechanism can be removed in respect of that storage item. For memory systems where memory space is particularly constrained, this process can be particularly beneficial, since the extra complexity introduced by the check mechanism and recovery mechanism will be outweighed by the potential memory savings achievable.

The check mechanism can take a variety of forms. However, in one embodiment, said step (e) comprises the step of modifying at least the program code of each function that may write to said at least one storage item to cause a check operation to be performed whenever that at least one storage item is written to. As an example, considering the storage item to be a field, and considering the Java programming language, a "putfield" bytecode is used to write to a field, and each occurrence of the putfield bytecode that references a storage item that has had its size speculatively modified could be replaced by a new instruction sequence which checks that the value to be written will fit in the modified size allocated to the storage item, and if so then invokes the putfield mechanism, whereas if not the recovery mechanism is then invoked.

As an alternative to the above software based check mechanism, a hardware based check mechanism could be used. In particular, in one embodiment, said step (e) comprises employing a hardware trap mechanism to detect a condition where a value to be written to a memory location associated with a storage item that has been speculatively modified exceeds the modified size, and on such detection to initiate the recovery mechanism. In one particular embodiment, the hardware trap mechanism could be arranged to detect a numerical overflow at a memory location associated with a storage item that has been speculatively modified, and on detection of such a numerical overflow to then initiate the recovery mechanism.

The recovery mechanism can take a variety of forms. However, in one embodiment where the storage items subjected to the memory reduction technique are fields identified by the class definition, said step (f) comprises the steps of: identifying all objects containing said storage item to be expanded; performing a garbage collection process to move said objects and to expand the size allocated to said objects sufficient to accommodate the new size allocated to the storage item; and modifying each function that can access said storage item. In many OOP systems, the objects created are stored in an area of memory subjected to garbage collection techniques. For example considering the Java programming environment, the Java virtual machine allocates an area in memory called a heap for storing such objects, and a garbage collection mechanism is used to identify objects that are no longer used and free up memory space. Part of the standard garbage collection process involves moving objects within the memory space to free up memory, and accordingly if the objects to be expanded are identified and the new size allocated to those storage items is also notified to the garbage collection mechanism, then the standard garbage collection mechanism can be arranged to move the objects and expand the size allocated to those objects to the new size during that moving process. Thereafter, it is necessary to modify each function that can access the field to take account of the new increased size of that field. This will involve modifying the program code that accesses the field, and also modifying any program code that accesses other fields whose locations have now changed as a result of the increased size allocated to the above-mentioned field.

Viewed from a second aspect, the present invention provides a computer program product bearing a computer program for controlling a computer to perform a method in accordance with the first aspect of the present invention in order to reduce memory usage of an object oriented program within a data processing apparatus.

Viewed from a third aspect, the present invention provides a data processing apparatus for performing a memory reduction process to reduce memory usage of an object oriented program, the object oriented program comprising at least one class definition used to create objects, each class definition providing at least one function that can be run in respect of objects created from that class definition, and identifying a number of storage items to be provided in memory for each object to store data values associated with the object, for each class definition the memory reduction process being performed prior to any objects being created from that class definition, and being performed in respect of at least a subset of the storage items identified by that class definition, the data processing apparatus comprising: determination logic for determining an original size associated with each storage item; analysing logic for analysing at least the class definition to identify any numeric ranges associated with the storage items; reduction determination logic, responsive to each storage item for which a numeric range is identified, to determine if the original size can be reduced whilst still supporting the numeric range, and if so to allocate to that storage item a modified size less than the original size; and modification logic for altering the class definition having regard to any storage element that has been allocated a modified size.

Whilst the determination logic, analysing logic, reduction determination logic and modification logic can take a variety of forms, in one embodiment these elements are provided by software executing within a virtual machine which itself is executing on a processor core of the data processing apparatus.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figure 1:
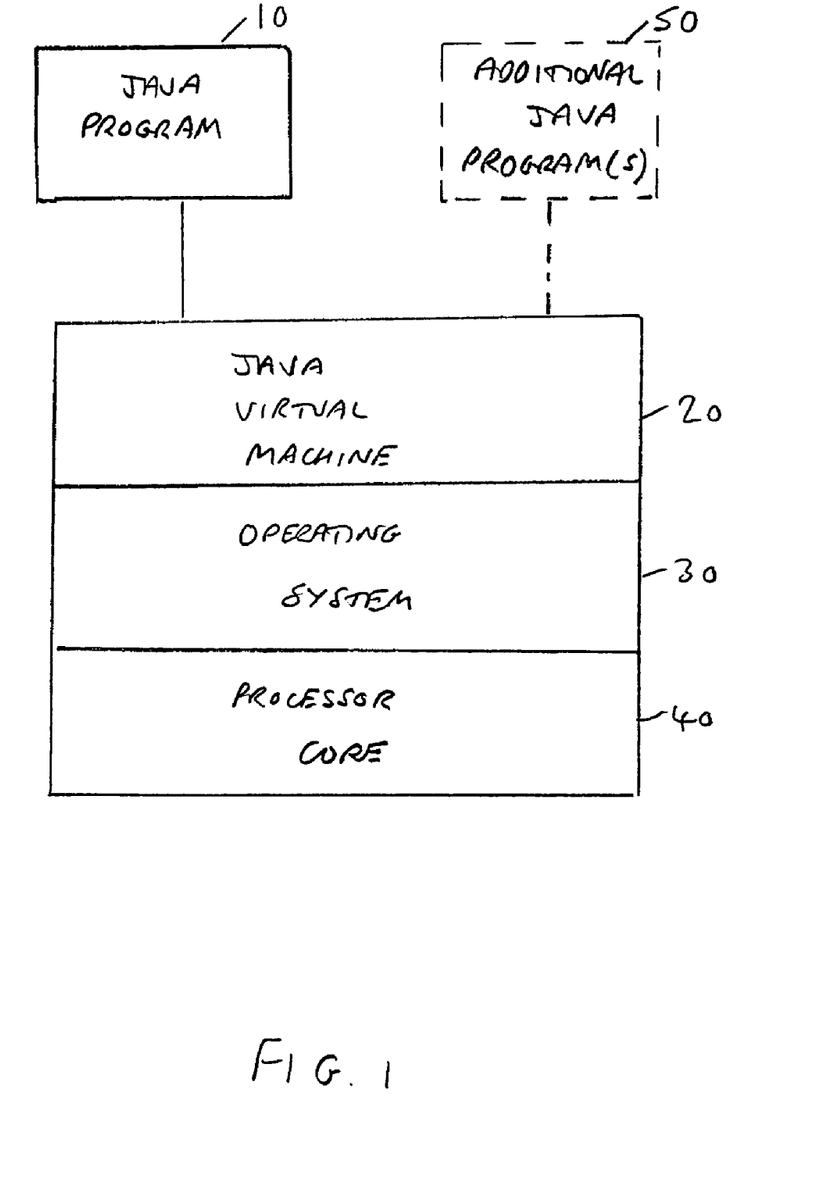
FIG. 1 is a block diagram of a data processing apparatus in accordance with one embodiment of the present invention.

Whilst the techniques of embodiments of the present invention will be applicable to a wide variety of OOP systems, for the purposes of illustrating the particular embodiment of the present invention, the Java object-oriented programming language will be considered. Java source code is compiled to produce runtime code known as bytecodes. However, the bytecode is not the binary code of any existing computer. Rather, Java bytecode is an architecture-neutral machine code that can be interpreted to run on any specific computer. A Java program 10 is executed by running an interpreter program called a Java Virtual Machine (JVM) 20. The JVM reads the bytecode program and interprets or translates it to the native instruction set of the computer on which it is installed. The bytecode will hence run on any computer platform on which a JVM is installed without any need for recompilation of the source code. Accordingly, as shown in FIG. 1, a standard operating system 30 may be executed on a processor core 40 of a data processing apparatus, with the JVM 20 providing an interface layer between the Java program 10 and the operating system 30. Some modern JVMs allow more than one Java program to be executed, and accordingly additional Java programs 50 may be run on the JVM 20.

Figure 2:
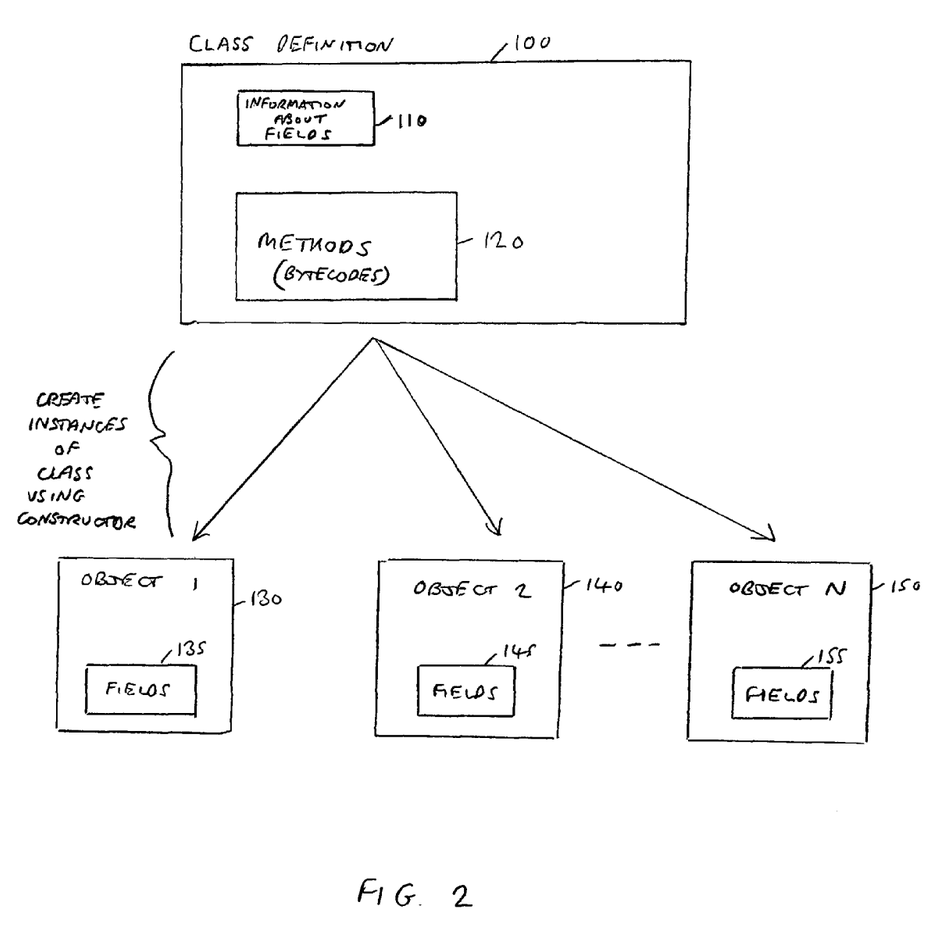
FIG. 2 schematically illustrates the creation of objects from a class definition.

A Java program 10 contains a number of class definitions used to create objects, each class definition providing at least one method that can be run in respect of objects created from that class definition, and identifying a number of storage items to be provided in memory for each object to store data values associated with that object. An example of a class definition is schematically illustrated in FIG. 2, and one type of storage item provided by the class definition is a field. Typically a number of fields will be defined by a class definition, and information defining those fields 110 will be provided as part of the class definition 100. Each time an object (also referred to as a class instance) 130, 140, 150 is created from the class definition, the fields are replicated for each object, and particular values for those fields allocated dependent on the object. Hence, as shown in FIG. 2, the objects 130, 140, 150 have fields 135, 145, 155, respectively, those fields having been created based on the field definition information 110 in the class definition 100. The class definition will also identify the methods 120 that can be run in respect of the objects 130, 140, 150, each method typically comprising a sequence of bytecodes.

Figure 3:
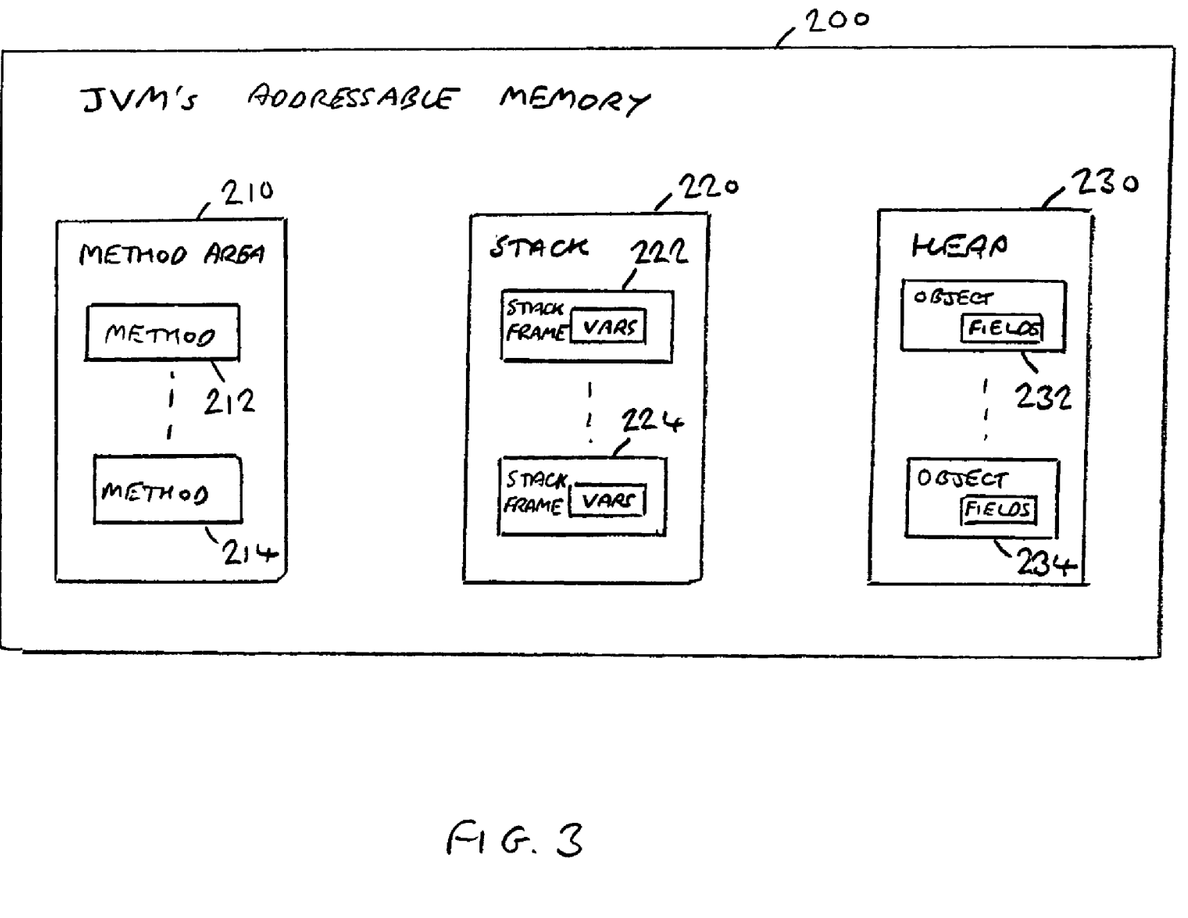
FIG. 3 is a diagram schematically illustrating the addressable memory available to a Java virtual machine in accordance with one embodiment of the present invention.

FIG. 3 schematically illustrates the addressable memory 200 available to a JVM. As shown in FIG. 3, three distinct areas of the addressable memory 200 are the method area 210, the stack memory 220 and the heap memory 230. All Java objects reside in the heap memory 230, and the heap memory is subjected periodically to garbage collection processes to identify and remove objects that are no longer used, in order to free up memory for future objects. As shown in FIG. 3, each of the objects 232, 234 within the heap memory 230 will contain an area specifying the fields of that object.

The method area 210 is where the bytecodes making up each method 212, 214 reside. A program counter, which points to (i.e. contains the address of) some byte in the method area, is used to keep track of the thread of execution.

The Java stack memory 220 is used to store parameters for, and results of, bytecode instructions, to pass parameters to and return parameters from methods, and to keep the state of each method invocation. The state of a method invocation is called its "stack frame", and each executing method allocates a stack frame in the stack memory 220. When the method returns the stack frame is discarded. The stack is so-called because it operates on a last-in-first-out basis. As shown in FIG. 3, each stack frame 222, 224 will typically include any temporary variables (vars) associated with the method, these temporary variables either being parameters passed to the method or local variables established by the method.

In accordance with embodiments of the present invention, a technique is provided for reducing memory usage of an object oriented program. This is achieved by seeking to reduce the space required for the fields of each object 232, 234 and/or the temporary variables provided for each stack frame 222, 224. The technique is particularly beneficial when applied in respect of the fields, since instances of these fields can be very numerous, due to the multiple objects that can be created from a single class definition.

In accordance with embodiments of the present invention, the memory reduction technique is applied in respect of a class definition prior to any objects being created from that class definition, and is performed in respect of at least a subset of the storage items identified by the class definition. In one particular embodiment, the memory reduction technique is incorporated as part of a class loading process performed by the JVM when it is determined that a class definition needs to be loaded into memory. In particular, at runtime, when it is determined that a class definition is required that has not yet been loaded, then a class loading mechanism is used to load the class definition into memory. It will be appreciated by those skilled in the art that the class definition may already reside somewhere in the memory system, but alternatively the class definition may not yet be in the memory system at all, and may need to be loaded from an external source such as a hard disk.

Figure 4:
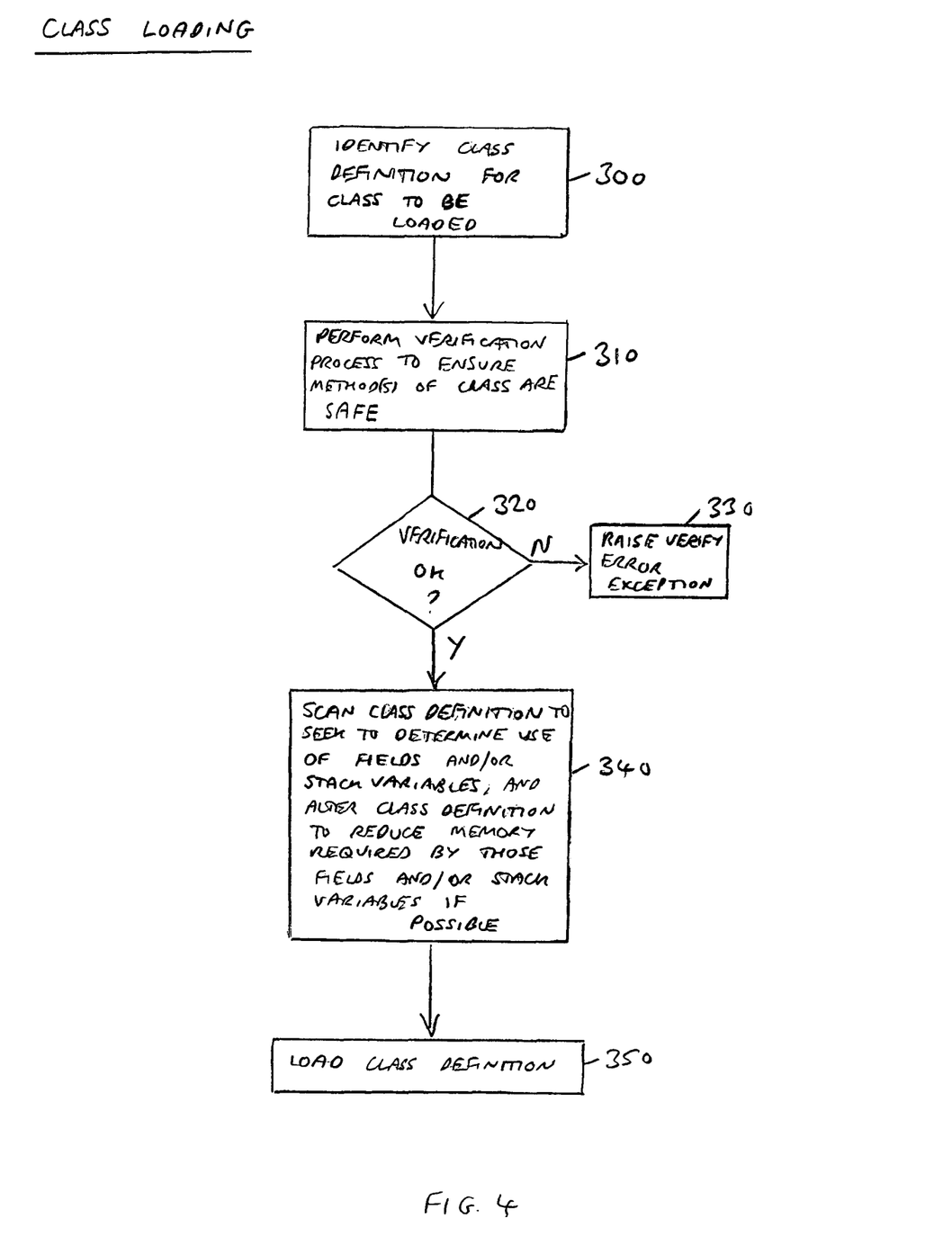
FIG. 4 is a flow diagram illustrating a class loading operation in accordance with one embodiment of the present invention.

The class loading mechanism used in accordance with embodiments of the present invention is schematically illustrated in FIG. 4. At step 300, the class definition for the class to be loaded is identified, and in particular it is determined where that class definition needs to be loaded from. Thereafter, at step 310 a verification process is performed to ensure that the methods of the class are safe. This verification process is also referred to as a "bytecode verification" process and is used as part of the linking of a Java program, prior to execution. The verification process ensures that the bytecode adheres to a set of rules defining well-formed Java class definitions. For example, if the verification process fails to confirm that a method in a class definition pushes two integers onto an operand stack before executing an "iadd" (i.e. integer addition) instruction, the verifier will reject that class definition. The reason for much of the verification process is to prevent the Java program from ever being able to write to or read from an arbitrary address, i.e. one not fully controlled by the VM.

At step 320 it is determined whether the verification process has verified that the class definition can be used, and if not a verify error exception is raised at step 330 to identify that the class definition has been rejected and cause appropriate exception handling to take place. However, assuming that it is determined at step 320 that the verification process has completed successfully, then the process proceeds to step 340, where the memory reduction technique of embodiments of the present invention is performed. In particular, the class definition is scanned to seek to determine use of fields and/or temporary variables (also referred to herein as stack variables), with the aim of seeking to reduce the memory required by those fields and/or stack variables if possible. The details of this process will be described in more detail later with reference to FIGS. 5A and 5B. Following step 340, the class definition is then loaded at step 350 in the standard manner. However, it should be noted at this point that if the process performed at step 340 has been able to identify fields and/or stack variables whose size can be reduced, this will have resulted in the class definition being altered, as a result of which the class definition loaded at step 350 is an altered version of the original class definition.

Figure 5A:
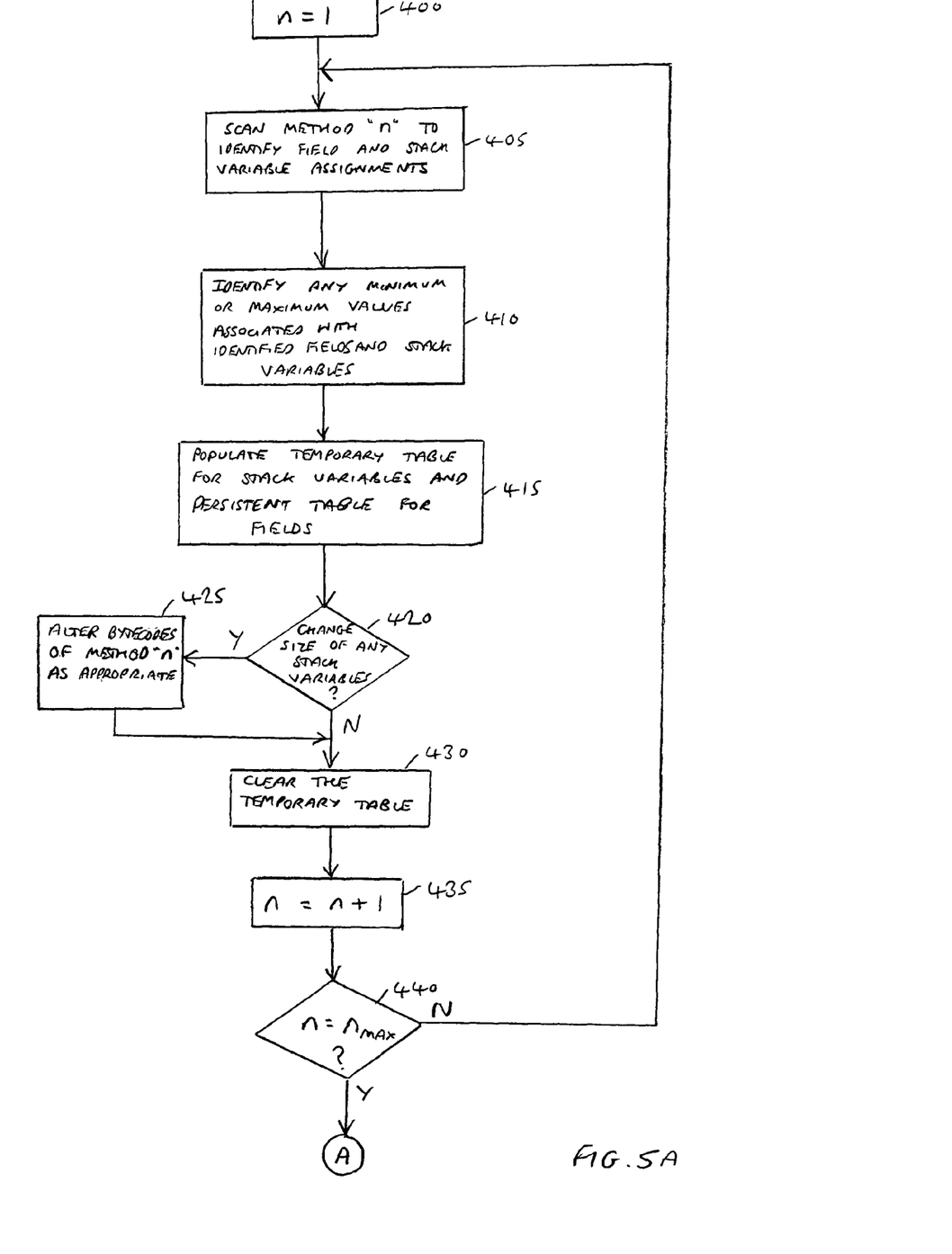
FIGS. 5A and 5B are flow diagrams illustrating in more detail the process performed at step 340 of FIG. 4 in accordance with one embodiment of the present invention.
Figure 5B:
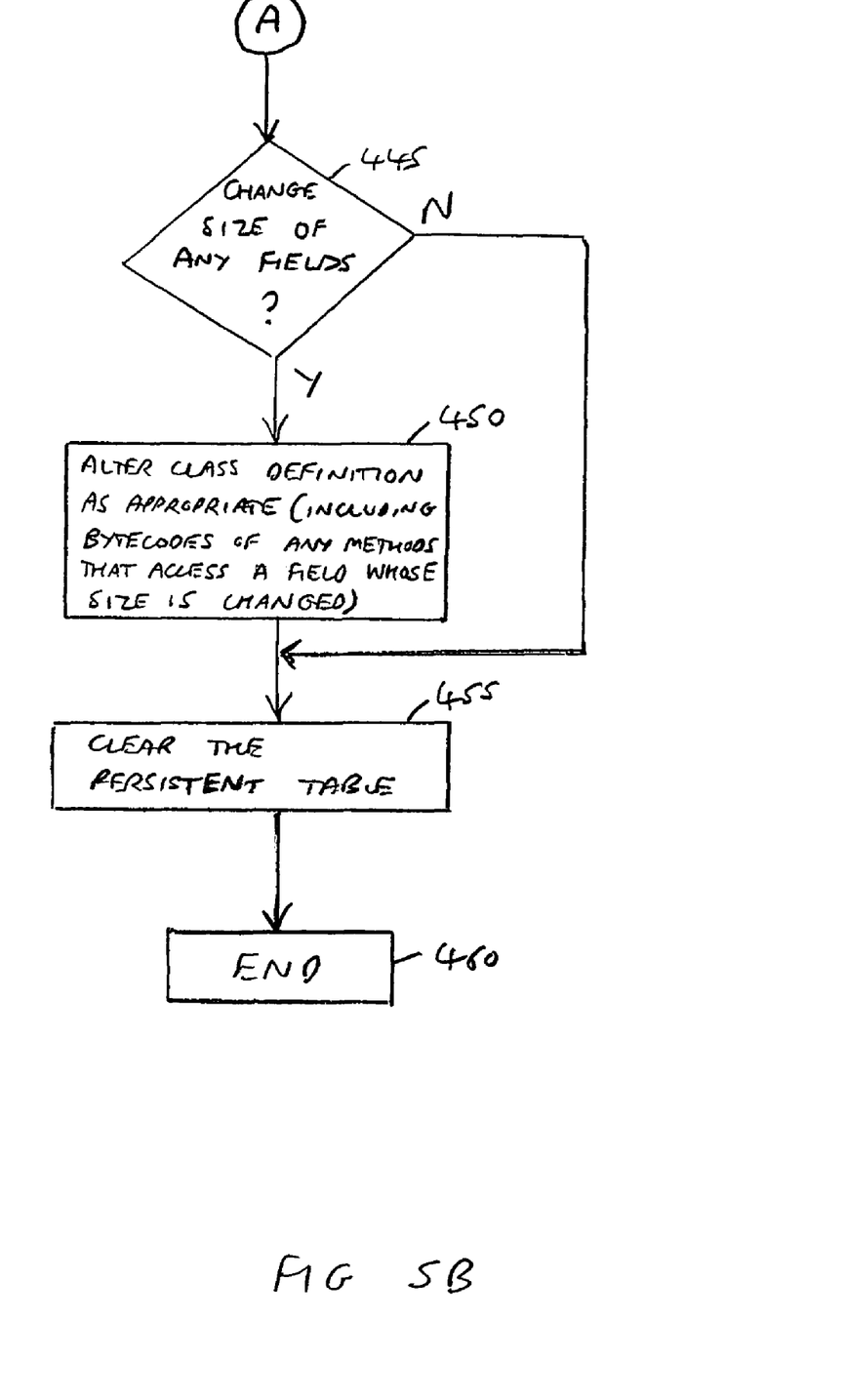

FIGS. 5A and 5B illustrate the process performed at step 340 of FIG. 4 in more detail. It is assumed that the particular class definition being considered will have a number of methods, which for the purpose of FIGS. 5A and 5B are identified as methods 1 to $n_{MAX}$. At step 400, the parameter n is set equal to one, whereafter at step 405, method n is scanned to identify field and stack variable assignments. For the purposes of the embodiment described with reference to FIGS. 5A and 5B, it is assumed that the memory reduction method is applied to both the fields and the stack variables, but it will be appreciated that in alternative embodiments the method may be applied to only one of these two types of storage items.

At steps 410, the process seeks to determine any minimum or maximum values associated with the identified fields and stack variables, and at step 415 a temporary table is populated for the stack variables and a persistent table is populated for the fields in order to record the information determined by steps 405 and 410. Hence, an entry in the temporary table will be assigned to each stack variable identified at step 405, and will identify that stack variable, the original type allocated to that stack variable, for example integer, byte, floating point number, etc, and will identify any minimum or maximum values determined at step 410 with respect to that stack variable. Similarly, the persistent table will have an entry allocated for each field used by that method, and again will identify the field, the type and any minimum or maximum values determined in respect of that field.

At step 420, it is determined from the information in the temporary table whether the size of any stack variables can be reduced, and if so the process proceeds to step 425, where the bytecodes of method n are altered as appropriate. This will involve altering the bytecodes that access a particular stack variable whose size is to be reduced so that they now refer to the reduced size of the stack variable. For example, if a stack variable is to be reduced from an integer size to a byte size, then the bytecodes accessing that stack variable are altered so as to refer to a byte-sized entity. Additionally, dependent on how the stack variables are addressed, it may be necessary to alter other bytecodes of the method that do not directly access the stack variable whose size is altered, but access other stack variables whose location will change as a result of the reduced size to be allocated to that stack variable. In Java, the bytecode "store" is used to write to stack variables, and the bytecode "load" is used to read from stack variables, and these instructions identify the size of the stack variable being accessed. Accordingly, these bytecodes need altering to refer to the modified size of the stack variable, and this may lead to consequential amendments to other bytecodes of the method, given the reduced size of the stack variable.

Following step 425, or it at step 420 it is determined that none of the stack variables can have their size reduced, the process proceeds to step 430 where the temporary table is cleared, whereafter at step 435 the value of n is incremented. Then, at step 440, it is determined whether n is equal to the value $n_{MAX}$, and if not the process returns to step 405 to scan the next method of the class definition.

Once it is determined at step 440 that n does equal the value $n_{MAX}$, this means that all of the methods of the class definition have been analysed, and accordingly the process proceeds to step 445, where it is determined with reference to the persistent table whether the size of any fields can be changed. For the purposes of the embodiment described with reference to FIGS. 5A and 5B, it is assumed that only private fields of the class definition are subjected to the memory reduction process, and accordingly once all of the methods of the class definition have been analysed, all of the relevant information that could identify a numeric range for each private field will have been analysed. If at step 445 it is determined that the size of any fields can be reduced, then the process proceeds to step 450, where the class definition is altered as appropriate. This will involve altering both the field defining information 110 of the class definition 100 (see FIG. 2) and also the bytecodes of any methods that access a field whose size is to be changed. In Java, a "putfield" instruction is used to write to a field and a "getfield" instruction is used to read from a field, and these instructions typically specify the size of the field being written to or read from. These instructions hence need modifying to refer to the reduced size.

Following step 450, the persistent table is cleared, whereafter the process ends at step 460. Alternatively, if it is determined at step 445 that none of the fields can have their size reduced, the process proceeds directly to step 445 where the persistent table is cleared and then the process is ended at step 460.

Whilst the flow diagrams of FIGS. 5A and 5B illustrate certain steps being performed sequentially, it will be appreciated by those skilled in the art that certain of the steps can indeed be performed in parallel. For example, the sequence of steps 405, 410, 415 can be performed in parallel. Indeed, it is possible in some embodiments for each of the methods to be analysed in parallel, with separate temporary tables being provided for each method.

Figure 6A:
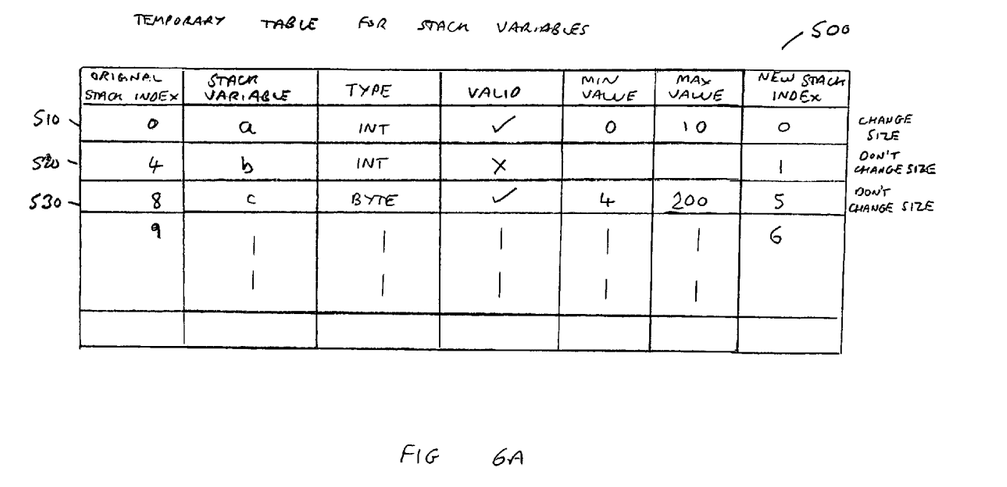
FIGS. 6A and 6B illustrate temporary and persistent tables used by the process of FIGS. 5A and 5B in accordance with one embodiment of the present invention.
Figure 6B:
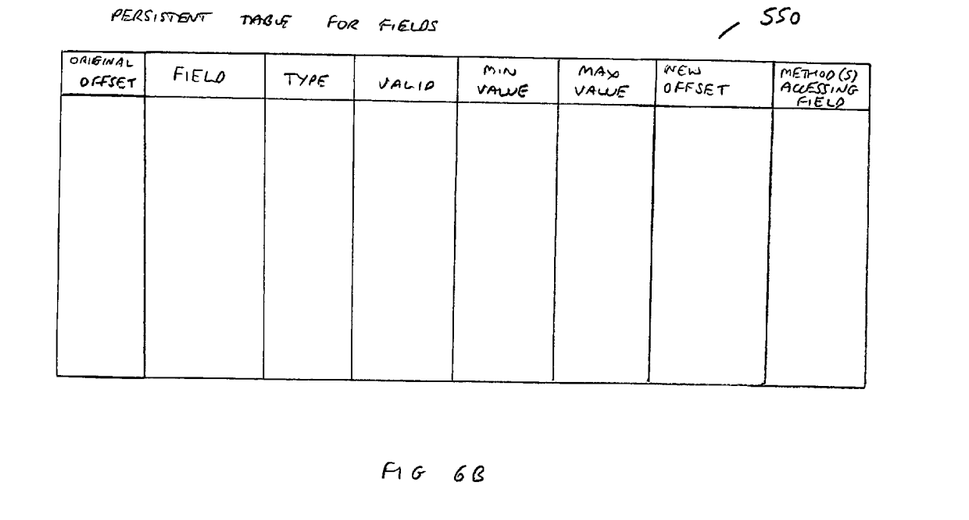

FIGS. 6A and 6B illustrate the temporary table used for stack variables and the persistent table used for fields, respectively, in accordance with one embodiment of the present invention. As shown in FIG. 6A, the temporary table 500 will contain a plurality of entries 510, 520, 530, one entry being used for each identified stack variable. The stack variable and its original type will be identified in the table, and any minimum or maximum values determined at step 410 will be added to the table. If a minimum and a maximum value are determined, the valid field will be set to indicate that the associated stack variable is a candidate for size reduction.

However, if either a minimum value, a maximum value, or both, cannot be established for a particular stack variable, then the valid field will not be set, and accordingly that stack variable will not be a candidate for size reduction. Optionally, the table may also include two columns identifying the original stack index to be associated with the stack variables and the new stack index to be associated with the stack variables. Hence, if at step 420 it is determined that the size of a particular stack variable can be changed, then the new stack index column is updated to take account of that size change, and that column is then used when determining at step 425 how the various bytecodes of the method should be changed.

Considering in particular the example entries 510, 520, 530 illustrated in FIG. 6A, it can be seen that the stack variable "a" is a candidate for having its size changed, and in fact due to the fact that it only needs to specify values from 0 to 10, it is determined that a byte can be allocated for that stack variable rather than the originally allocated integer, since 8 bits provide sufficient information for encoding all possible values. As a result, the new stack index for stack variable a is unchanged, but each following stack variable has its stack index changed. In particular, stack variable "b" which is not to have its size changed will no longer be located at index 4 on the stack, but will now be located at index 1 on the stack. This has a knock on effect for all of the other subsequent stack variables on the stack, as illustrated in FIG. 6A. It is also shown in FIG. 6A that for the stack variable "c", even though it is a candidate for having its size changed because both a minimum value and a maximum value have been determined at step 410, it is nevertheless decided that due to the numeric range that has been determined no possible size reduction is available. In this instance, the stack variable c is already specified as a byte, and hence it will not be possible to reduce the size of that stack variable given the numeric range encoded by the minimum and maximum values identified for stack variable c.

It should be noted at this point that the modified size that can be allocated to either a stack variable, or indeed to a field, does not need in all embodiments to be a size that is explicitly supported by the original programming language. For example there is nothing to prevent the use of four bit quantities in Java if desired, for example if a field or stack variable identified as a byte actually only needs four bits of information to encode the numeric range identified for that field or stack variable. Once the VM method is loaded, the VM is free to create and use additional instructions (e.g. loadnibble) that are not in the original virtual machine language specification.

FIG. 6B illustrates the persistent table that is used for fields, and it will be appreciated from a comparison of FIG. 6B and FIG. 6A that the basic format is the same. If the location of the various fields are identified by offset values, then the original offset values can be populated in the table, and if for a particular field a reduction in size is determined to be appropriate, the new offset column can be updated to provide new offsets for each of the identified fields resulting from the change of size to a particular field. Additionally, the persistent table used for the fields may have an additional column identifying the methods accessing each field. This is useful to assist in the performance of step 450, where any methods accessing the field will have to be altered, and will avoid any unnecessary rescanning of methods to determine whether they need altering.

Often the fields and stack variables will be specified as separate entities, but it is also possible that in some embodiments certain fields and/or stack variables will be specified as array members. In the event of arrays, in one embodiment a single entry will be identified in the temporary table (for an array of stack variables) or the persistent table (for an array of fields), and the minimum and maximum values will be determined by performing an analysis with respect to all of the members of the array. If from the determined minimum and maximum values it can be established that a reduction in size can take place, then this reduction in size can be applied to each of the members of the array.

In accordance with one embodiment, only those fields and/or stack variables for which a numeric range is identified are subjected to the memory reduction technique of embodiments of the present invention. However, in an alternative embodiment, the mechanism can also selectively be applied to fields or stack variables with indefinite ranges, or with ranges that are considered too expensive to determine using the analysis mechanism discussed earlier with reference to FIGS. 5A and 5B. In accordance with such embodiments, for selected fields and/or stack variables for which a numeric range is not identified by the analysis process, a modified size less than the original size can be speculatively allocated, and then a check mechanism is used to determine, whenever such fields or stack variables are accessed, whether the modified size allocated to them is still sufficient. If not, a recovery mechanism is performed to expand the size as required.

The check mechanism can take a variety of forms. However, in one embodiment, considering the fields provided within a class definition of a Java program, the "putfield" instruction is used to write to a field. For a field that has been speculatively reduced in size, any putfield instruction within the methods of the class that seeks to access that field can be modified to incorporate one or more instructions required to check whether the data to be written will fit in the modified size allocated to that field. If it can, then the standard putfield instruction can then be executed, whereas otherwise the recovery mechanism can be invoked.

Alternatively, hardware support can be used to perform the check mechanism. In particular, a hardware trap mechanism could be employed by the processor core 40 of FIG. 1 to detect a condition where a value to be written to a memory location associated with a field that has been speculatively reduced in size will exceed the allocated size, and on that detection to initiate the recovery mechanism. In one particular embodiment, such a hardware trap mechanism could seek to detect a situation where a numerical overflow occurs at a memory location associated with the field that has been speculatively reduced in size, and upon such detection to initiate the recovery mechanism.

Figure 7:
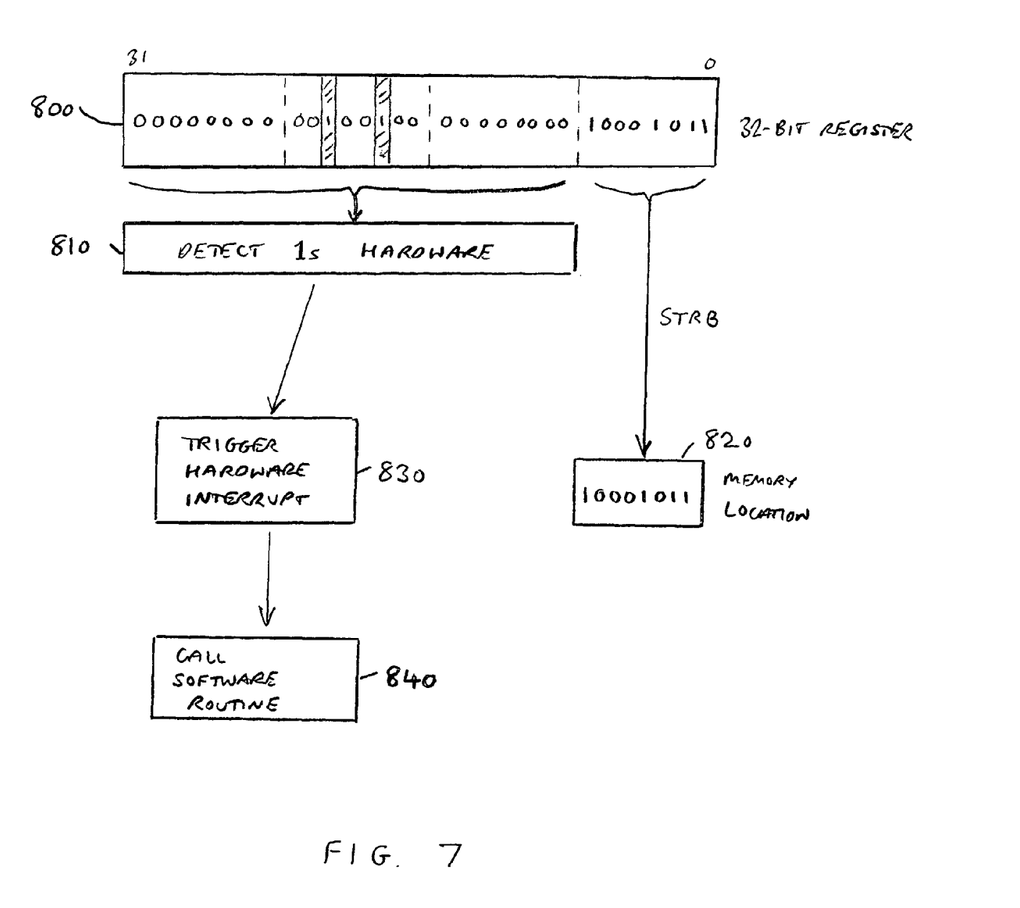
FIG. 7 is a diagram schematically illustrating a hardware approach for performing a check mechanism in accordance with one embodiment of the present invention.

FIG. 7 is a diagram schematically illustrating one such hardware approach that can be used. As mentioned previously with reference to FIG. 1, The JVM reads the Java bytecode program and interprets or translates it to the native instruction set of the computer on which it is installed, so that the processor core 40 then executes its native instructions. In one embodiment these native instructions will identify working registers of the processor core used to hold the data to be manipulated by the instructions, and in the particular embodiment illustrated in FIG. 7 these registers are 32 bit registers. Existing instructions may exist for storing a byte of data or a half word of data to memory and typically these will store the least significant 8 or 16 bits, respectively, from a specified 32-bit register to memory, ignoring the other more significant bits.

If such instructions were to be used to write a data value to a memory location associated with a field that has been speculatively reduced in size, then a hardware mechanism can be used when such instructions are executed in order to check the remaining unused bits in the 32-bit register to see if any of those bits are set, hence indicating a data value that exceeds the allocated size in memory.

In particular, FIG. 7 illustrates execution of a store byte (STRB) instruction specifying 32-bit register 800 as its source operand. If a control flag has been set for the CPU identifying that it should perform the above-mentioned check when executing such a STRB instruction, then in addition to the least significant 8 bits being written to the specified memory location 820, the detection hardware 810 will check to see if there are any logic one bits in the upper 24 bits of the value held in the register 800. In the example illustrated in FIG. 7, there are 2 such bits and accordingly the hardware 810 will trigger a hardware interrupt as indicated by box 830. This will cause an interrupt to be taken and processing to branch to a software routine 840 in order to initiate the recovery mechanism.

As an alternative to setting a control flag to trigger use of the detection hardware 810, new instructions could be defined to replicate the store operation, but with the additional check operation. Hence, by way of example a standard STRB instruction could be arranged in the standard manner to cause the least significant 8 bits to be stored to memory without any check being performed by the detection hardware 810, whereas a new STRB1 instruction could be arranged to cause the least significant 8 bits to be stored to memory and for the detection hardware 810 to perform the above-mentioned check operation.

Figure 8:
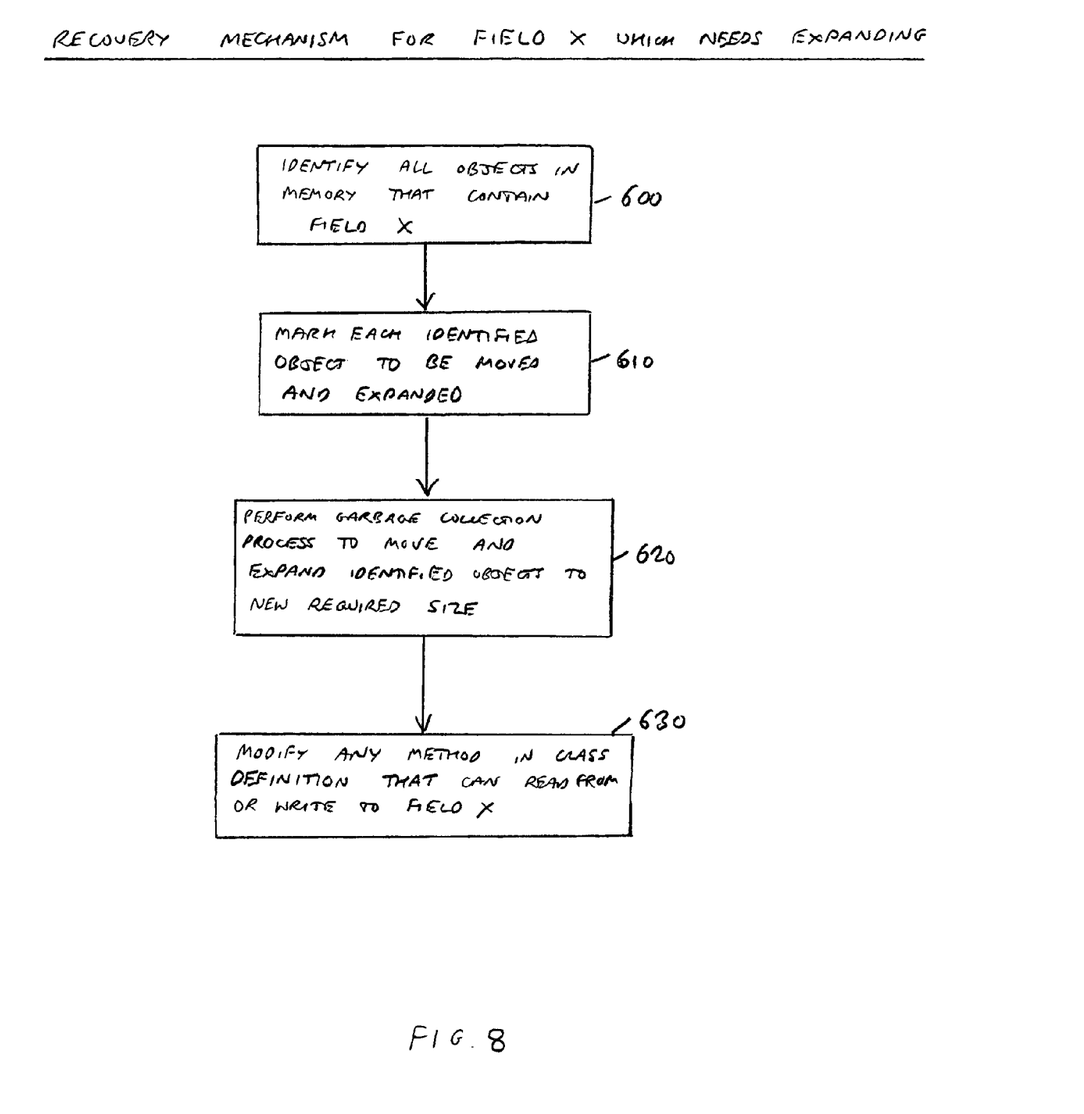
FIG. 8 is a flow diagram illustrating a recovery mechanism employed in one embodiment of the present invention in situations where the size associated with a particular field has been speculatively reduced and later needs expanding.

FIG. 8 is a flow diagram illustrating one embodiment of a recovery mechanism that can be used when a particular field is identified via the check mechanism as requiring expanding. At step 600, all of the objects in memory that contain that field (in FIG. 8 the field being referred to as field X) are identified, this involving referencing the heap memory 230 to identify all objects that have been created from the class definition containing field X. Thereafter, at step 610, each such identified object is marked to identify that it needs to be moved and expanded. Such marking may be performed by setting a bit in a header entry for the relevant objects. As discussed below, additional marking of objects may be performed by the garbage collection mechanism of the heap memory as part of its general garbage collection process.

Thereafter, at step 620, the garbage collection mechanism provided in respect of the heap memory 230 performs a garbage collection process, that garbage collection mechanism being provided with an indication of the new size required for each marked object. As part of the standard garbage collection process, the garbage collection mechanism will identify and remove any objects no longer used, and for the objects that are still used, will move those objects so as to make more efficient use of the memory. For example, this will often involve marking and moving the objects so they are placed sequentially within memory such that the available memory in the heap is provided as a large block, thereby providing maximum flexibility for use in respect of new objects. As part of this moving procedure, any objects marked at step 610 will be expanded to the new required size as they are moved.

At step 630, any methods in the class definition that can read from or write to field X are then modified so that they use the new size allocated to that field. As discussed earlier, dependent on how the fields are addressed, this process may also involve modifying not only the bytecodes that directly access field X, but also other bytecodes within the methods that access other fields, since the offsets to these fields may have altered as a result of the change in size to field X.

Such a check and recovery mechanism can be particularly beneficial in systems with very tight memory requirements, since the potential benefits realised from speculatively reducing the size of certain fields and/or stack variables will outweigh the additional complexity required to check and expand those fields and/or stack variables as and when required.

Figure 9:
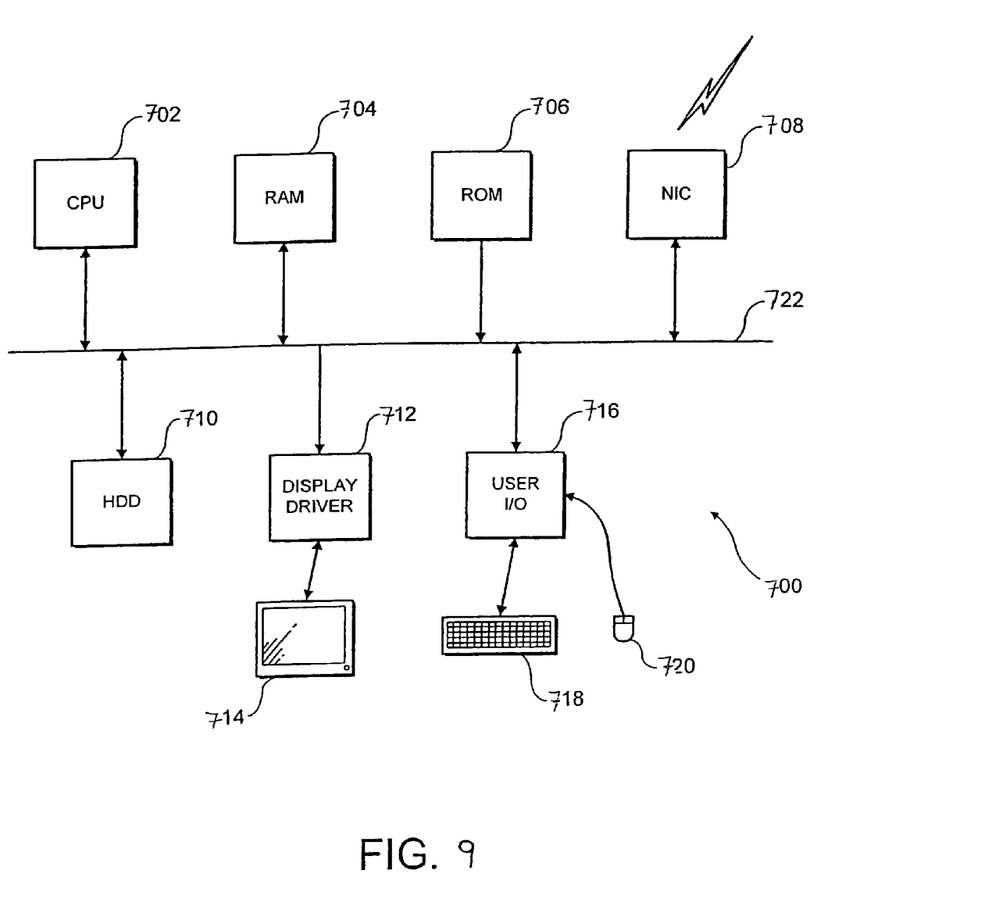
FIG. 9 schematically illustrates a general purpose computer of the type that may be used to implement the present technique.

FIG. 9 schematically illustrates a general purpose computer 700 of the type that may be used to implement the above described techniques. The general purpose computer 700 includes a central processing unit 702, a random access memory 704, a read only memory 706, a network interface card 708, a hard disk drive 710, a display driver 712 and monitor 714 and a user input/output circuit 716 with a keyboard 718 and mouse 720 all connected via a common bus 722. In operation the central processing unit 702 will execute computer program instructions that may be stored in one or more of the random access memory 704, the read only memory 706 and the hard disk drive 710 or dynamically downloaded via the network interface card 708. The results of the processing performed may be displayed to a user via the display driver 712 and the monitor 714. User inputs for controlling the operation of the general purpose computer 700 may be received via the user input output circuit 716 from the keyboard 718 or the mouse 720. It will be appreciated that the computer program could be written in a variety of different computer languages. The computer program may be stored and distributed on a recording medium or dynamically downloaded to the general purpose computer 700. When operating under control of an appropriate computer program, the general purpose computer 700 can perform the above described techniques and can be considered to form an apparatus for performing the above described techniques. The architecture of the general purpose computer 700 could vary considerably (e.g. hand-held games computers, mobiles, personal digital assistants etc.) and FIG. 9 is only one example.

In accordance with the above described embodiments of the present invention, it will be appreciated that such techniques provide the virtual machine with the ability to dynamically alter the types allocated to particular fields and/or stack variables prior to any objects being created from the class definition specifying those storage items. By such an approach, the virtual machine is provided with some intelligence, since even if, by way of example, the class definition it is handling provides a 32 bit number to count up to five with, it will decide only to assign a character to that storage item, or may be a bit-range for Boolean values. Accordingly, the embodiments of the present invention allow the running VM to change the data size of certain storage items when it loads in new classes. As another example, if the storage item in question is identified as a Java Long (i.e. 64 bits) but is only addressed by $2^7$ values, an internal 8-bit signed value could be allocated for that storage item, thereby using only a quarter of the space.

Although a particular embodiment of the invention has been described herein, it will be apparent that the invention is not limited thereto, and that many modifications and additions may be made within the scope of the invention. For example, various combinations of the features of the following dependent claims could be made with the features of the independent claims without departing from the scope of the present invention.

I claim:

1. A method of reducing memory usage of an object oriented program within a data processing apparatus, the object oriented program comprising at least one class definition used to create objects, each class definition providing at least one function that can be run in respect of objects created from that class definition, and identifying a number of storage items to be provided in memory for each object to store data values associated with the object, for each class definition the method being performed prior to any objects being created from that class definition, and being performed in respect of at least a subset of the storage items identified by that class definition, the method comprising the steps of:

(a) determining an original size associated with each storage item;

(b) analysing at least the class definition to identify any numeric ranges associated with the storage items;

(c) for each storage item for which a numeric range is identified, determining if the original size can be reduced whilst still supporting the numeric range, and if so allocating to that storage item a modified size less than the original size; and (d) altering the class definition having regard to any storage item that has been allocated a modified size.

2. A method as claimed in claim 1, wherein the storage items are fields identified by the class definition, and said step (b) comprises the step of:

reviewing each function provided by the class definition to determine said numeric ranges.

3. A method as claimed in claim 2, wherein said at least a subset of the storage items comprises any private fields identified by the class definition.

4. A method as claimed in claim 1, wherein the storage items are temporary variables associated with functions, and said step (b) comprises the step of:

for each temporary variable, reviewing the associated function to identify any numeric range associated with that temporary variable.

5. A method as claimed in claim 1, wherein the method is performed by a virtual machine executing on a processing circuit of the data processing apparatus.

6. A method as claimed in claim 5, wherein the method is performed during a class loading operation performed by the virtual machine, such that the altered class definition is loaded into memory.

7. A method as claimed in claim 1, wherein said step (c) further comprises the step of, for at least one storage item for which a numeric range is not identified, speculatively allocating to that storage item a modified size less than the original size, and the method further comprises the steps of:

(e) providing a check mechanism to determine, whenever said at least one storage item is accessed, whether the modified size allocated to that storage item is sufficient; and (f) if the modified size is not sufficient, performing a recovery mechanism to expand the size allocated to that storage item to a new size.

8. A method as claimed in claim 7, wherein said step (e) comprises the step of modifying at least the program code of each function that may write to said at least one storage item to cause a check operation to be performed whenever that at least one storage item is written to.

9. A method as claimed in claim 7, wherein said step (e) comprises employing a hardware trap mechanism to detect a condition where a value to be written to a memory location associated with the at least one storage item exceeds the modified size, and on such detection to initiate the recovery mechanism.

10. A method as claimed in claim 7, wherein the storage items are fields identified by the class definition, and said step (f) comprises the steps of:

identifying all objects containing said storage item to be expanded;

performing a garbage collection process to move said objects and to expand the size allocated to said objects sufficient to accommodate the new size allocated to the storage item; and modifying each function that can access said storage item.

11. A computer program product including a non-transitory computer readable storage medium bearing a computer program for controlling a computer to perform the method of claim 1 in order to reduce memory usage of an object oriented program within a data processing apparatus.

12. A data processing apparatus for performing a memory reduction process to reduce memory usage of an object oriented program, the object oriented program comprising at least one class definition used to create objects, each class definition providing at least one function that can be run in respect of objects created from that class definition, and identifying a number of storage items to be provided in memory for each object to store data values associated with the object, for each class definition the memory reduction process being performed prior to any objects being created from that class definition, and being performed in respect of at least a subset of the storage items identified by that class definition, the data processing apparatus comprising a processing circuit including:

determination logic for determining an original size associated with each storage item;

analysing logic for analysing at least the class definition to identify any numeric ranges associated with the storage items;

reduction determination logic, responsive to each storage item for which a numeric range is identified, to determine if the original size can be reduced whilst still supporting the numeric range, and if so to allocate to that storage item a modified size less than the original size; and modification logic for altering the class definition having regard to any storage item that has been allocated a modified size.

13. A data processing apparatus for performing a memory reduction process to reduce memory usage of an object oriented program, the object oriented program comprising at least one class definition used to create objects, each class definition providing at least one function that can be run in respect of objects created from that class definition, and identifying a number of storage items to be provided in memory for each object to store data values associated with the object, for each class definition the memory reduction process being performed prior to any objects being created from that class definition, and being performed in respect of at least a subset of the storage items identified by that class definition, the data processing apparatus comprising:

determination logic means for determining an original size associated with each storage item;

analysing logic means for analysing at least the class definition to identify any numeric ranges associated with the storage items;

reduction determination logic means, responsive to each storage item for which a numeric range is identified, for determining if the original size can be reduced whilst still supporting the numeric range, and, if so for allocating to that storage item a modified size less than the original size; and modification logic means for altering the class definition having regard to any storage item that has been allocated a modified size.

* * * * *